Feb. 26, 1952 A. DUERKSEN 2,587,297
MATRIX FOR TIRE TREADS WITH LATERAL TRACTION SLITS
Original Filed July 16, 1948

INVENTOR
Arnold Duerksen

BY
ATTORNEYS

Patented Feb. 26, 1952

2,587,297

UNITED STATES PATENT OFFICE 2,587,297

MATRIX FOR TIRE TREADS WITH LATERAL TRACTION SLITS

Arnold Duerksen, Lodi, Calif., assignor to Super Mold Corporation of California, Lodi, Calif., a corporation of California Original application July 16, 1948, Serial No. 39,156. Divided and this application November 22, 1949, Serial No. 128,863

2 Claims. (Cl. 18—18)

This invention relates generally to the forming of treads on motor vehicle tires, especially during recapping of used tires.

The invention is directed in particular to, and it is an object to provide, a novel matrix adapted to form tire treads with lateral traction slits extending therein from the circumferential tread design grooves; such slits not only enhancing the appearance of the tread but improving the antiskid or road gripping characteristics thereof.

A further object of this invention is to provide a novel, tire tread matrix which includes elements thereon, of especial configuration, to form the lateral traction slits in the tread as the latter is shaped.

Another object of the invention is to provide a tire tread matrix, as above, in which the traction slit forming elements are radially inwardly projecting, sheet metal inserts, known as sipes, fixed in connection with the matrix and extending laterally from the tread groove forming ribs of the matrix design.

An additional object of the invention is to provide a tire tread matrix, as in the preceding paragraphs, wherein the sheet metal inserts, for forming the traction slits, are fixed to the matrix during the die casting of the tread groove forming ribs thereon.

A further object of the invention is to provide a practical and reliable tire tread matrix with lateral traction slit forming elements thereon, and a matrix which will be exceedingly effective for the purpose for which it is designed.

These objects are accomplished by means of such structure and relative arrangement of parts as will fully appear by a perusal of the following specification and claims.

This invention is a division of application, Serial No. 39,156, filed July 16, 1948, on Matrix for Tire Treads with Lateral Traction Slits, and Method of Making the Matrix.

Figure 1:
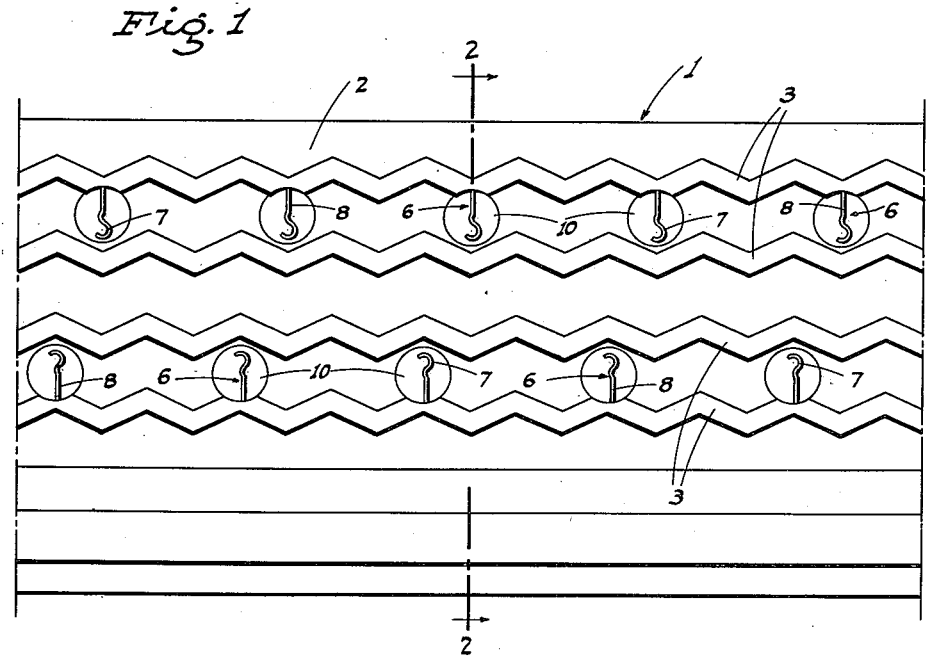
Fig. 1 is a fragmentary elevation of the working face of the matrix showing a number of the sheet metal, slit forming inserts thereon.
Figure 2:
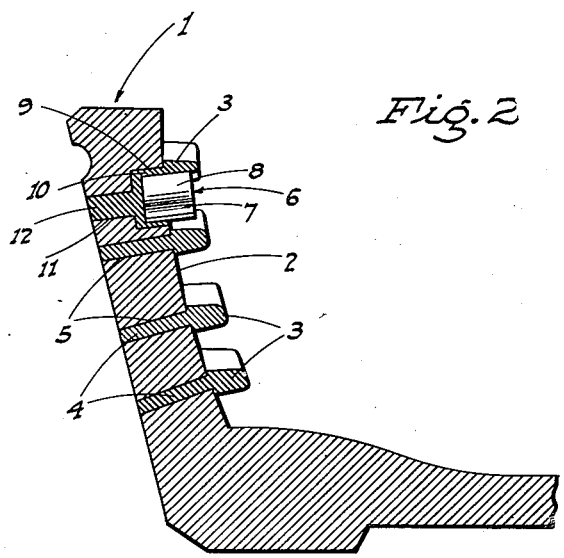
Fig. 2 is a cross section on line 2—2 of Fig. 1, showing one of the sheet metal inserts as fixed on the matrix.

Referring now more particularly to the characters of reference on the drawings, the numeral 1 indicates generally an annular matrix body having a radially inward working face 2 on the inner side thereof. The annular matrix body 1 is formed, about the working face 2, with a plurality of circumferential, transversely spaced, tread groove forming ribs; such ribs being die cast onto the matrix body 1 by suitable apparatus, such as that shown in United States Letters Patent No. 2,478,657.

The tread groove forming ribs 3, as die cast onto and projecting radially inward from the working face 2, are integral with anchor spurs 4 which remain in ducts 5 through which the die cast metal is introduced during the rib forming operation.

Between certain adjacent ones of the tread groove forming ribs 3, the matrix includes, in circumferentially spaced relation, a multiplicity of laterally extending, radially inwardly projecting, web-like inserts or sipes 6 of relatively thin sheet metal, having a predetermined longitudinal configuration previously imparted thereto as by stamping. In the present instance each sheet metal insert or sipe 6 comprises, in end view, a generally S-shaped portion 7, and a straight web portion 8.

The sheet metal inserts or sipes 6 are each mounted in connection with the matrix body 1 as follows:

Approximately the radially outermost half of each insert 6 projects symmetricaly into a circular bore 9 in the matrix body 1, being fixedly secured in said bore by a die cast metal plug 10, which plug is die cast into said bore through a duct 11. An anchor spur 12, integral with each plug 10, remains in the related duct 11 after the die casting operation. Each bore 9 and plug 10 therein is disposed so that the related sheet metal insert 6 extends laterally from a corresponding one of the tread groove forming ribs 3 toward, but terminating short of, an adjacent one of said ribs.

The inserts 6 are each disposed so that the straight web portion 8 of each thereof extends laterally from the corresponding rib 3, with the S-portion 7 near, but clear of, the adjacent rib. The radially inward projection of the inserts 6 is substantial and approaches that of the ribs 3.

When the described matrix is employed in a vulcanizing machine to shape a tread upon a tire, as for example in recapping, the circumferential, transversely spaced ribs 3 form the tread grooves, while the sheet metal inserts 6 form traction slits which extend laterally from certain of said grooves, with said slits of substantial depth and in communication at one end with such grooves. The communicating end is of course opposite the S-shaped end of the slits formed by the S-portions 7 of the inserts.

The described matrix provides a novel and effective device for the shaping of tire treads with lateral traction slits; the matrix being designed so that it may be manufactured readily and conveniently, and when manufactured being sturdy and capable of long use.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tire tread matrix comprising a circumferential matrix body having an inner working face, a pair of laterally spaced circumferential radially inwardly projecting ribs disposed on said face, and a plurality of relatively thin transversely disposed inserts; each insert projecting from the side of one rib toward but terminating short of the side of the other rib and the radially inner edges of the inserts terminating short of the the radially inner edges of the ribs.

2. A tire tread matrix comprising a circumferential matrix body having an inner working face, a pair of laterally spaced circumferential radially inwardly projecting ribs disposed on said face, circumferentially spaced plugs embedded in the working face of the body and disposed between the ribs in contact with one rib but terminating short of the other rib, and transversely projecting relatively thin inserts partially embedded in the plugs and in contact with said one rib and terminating short of the other rib.

ARNOLD DUERKSEN.

REFERENCES CITED

The following references are of record in the file of this patent:

UNITED STATES PATENTS

| Number | Name | Date |
|---|---|---|
| 2,224,337 | Bostwick | Dec. 10, 1940 |
| 2,275,582 | Bull | Mar. 10, 1942 |

FOREIGN PATENTS

| Number | Country | Date |
|---|---|---|
| 781,104 | France | Feb. 18, 1935 |